United States Patent
Priola (10) Patent No.: US 10,920,926 B2
(45) Date of Patent: Feb. 16, 2021

(54) SWIVELLING MOVIE SCREEN SUSPENDER AND METHOD

(71) Applicant: James W. Priola, San Clemente, CA (US)

(72) Inventor: James W. Priola, San Clemente, CA (US)

(73) Assignee: Airwall Hangers Corporation, San Diego, CA (US)

( * ) Notice: Subject to any disclaimer, the term of this patent is extended or adjusted under 35 U.S.C. 154(b) by 0 days.

(21) Appl. No.: 16/258,122

(22) Filed: Jan. 25, 2019

(65) Prior Publication Data

US 2020/0240583 A1 Jul. 30, 2020

(51) Int. Cl.
*F16M 13/02* (2006.01)
*G03B 21/58* (2014.01)
*F16M 11/08* (2006.01)
*F16M 11/04* (2006.01)

(52) U.S. Cl.
CPC ........ *F16M 13/027* (2013.01); *F16M 11/041* (2013.01); *F16M 11/08* (2013.01); *G03B 21/58* (2013.01); *F16M 2200/022* (2013.01); *F16M 2200/066* (2013.01)

(58) Field of Classification Search
CPC .... A47G 1/16; F16M 11/10; F16M 2200/066; F16M 2200/022; F16M 11/08; F16M 11/047; F16M 13/027; F21V 21/28; B60R 11/0235; A47B 81/065; A47B 97/001; A47B 81/062; G03B 21/562; G03B 21/56; B03B 21/58
See application file for complete search history.

(56) References Cited

U.S. PATENT DOCUMENTS

| | | | | | |
|---|---|---|---|---|---|
| 2,015,807 | A | * | 10/1935 | Miller | C03B 35/20 269/46 |
| 2,114,664 | A | * | 4/1938 | Gelb | F21V 21/34 362/33 |
| 2,115,106 | A | * | 4/1938 | Hinsey | C03B 35/20 294/118 |
| 3,750,994 | A | * | 8/1973 | Bieschke | G03B 21/58 248/324 |
| 3,784,145 | A | * | 1/1974 | Lawrie | F16M 11/28 248/571 |
| 4,240,660 | A | * | 12/1980 | Roth | C03B 35/20 248/323 |
| 5,165,647 | A | * | 11/1992 | Ribeiro | A61M 5/1415 248/323 |
| 5,381,991 | A | * | 1/1995 | Stocker | G09F 7/18 248/206.5 |

(Continued)

*Primary Examiner* — Christopher Garft
(74) *Attorney, Agent, or Firm* — Charmasson, Buchaca & Leach, LLP (57) ABSTRACT

A framework for temporarily suspending a movie screen from a ceiling track includes an oblong beam adjustably mounted to the track. A locking pivot mechanism secured to a middle part of the beam supports a pair of oppositely extending cantelevered booms. Each boom can have inwardly extending substantially parallel rails similar to a ceiling track. Each of the booms can carry variously sized locking cradles which can support a spar for a movie screen or other structures. A second locking pivot mechanism having a rotation axis mutually orthogonal to the first pivot mechanism can provide the booms with additional adjustability.

8 Claims, 5 Drawing Sheets

(56) References Cited

U.S. PATENT DOCUMENTS

| | | | |
|---|---|---|---|
| 7,090,270 B2* | 8/2006 | Narayanaswamy | C03B 35/20 |
| | | | 294/118 |
| 7,316,380 B2* | 1/2008 | Arakawa | A47F 5/0006 |
| | | | 24/136 A |
| 7,958,684 B2* | 6/2011 | Kleege | E04B 9/006 |
| | | | 52/243.1 |
| 8,091,849 B2* | 1/2012 | Ayadhi | F16M 11/425 |
| | | | 248/323 |
| 2008/0134554 A1* | 6/2008 | Pitcher | G09F 7/18 |
| | | | 40/606.14 |
| 2011/0315846 A1* | 12/2011 | Andren | E05D 15/0634 |
| | | | 248/323 |
| 2016/0037924 A1* | 2/2016 | Bromley | F16M 11/2092 |
| | | | 211/26 |
| 2017/0127544 A1* | 5/2017 | Liu | G09F 9/30 |
| 2017/0153013 A1* | 6/2017 | Balkaya | F21V 21/15 |

* cited by examiner

SWIVELLING MOVIE SCREEN SUSPENDER AND METHOD

FIELD OF THE INVENTION

This invention relates to ceiling track fasteners and more specifically to devices used to suspend structures and equipment such as movie screens from tracks in ceilings, walls and other similar structural surfaces.

BACKGROUND

Arranging a site for a spectacle, meeting or other gathering requires the temporary installation of a large amount of equipment and other structures. Often, space and setup time are limited. The ceilings of meeting rooms, convention centers, civic centers, classrooms, banquet facilities, conference centers, lecture halls, hotel ballrooms, restaurants, and other public gathering facilities are often crisscrossed by tracks from which movable room dividers or curtain partitions are suspended.

Some items can be suspended from ceilings, beams or other overhead elements or attached to walls in a very secure, but also quickly adjustable manner. This frees up floor space for additional seating so that capacities and thus revenue for a given room can be increased. For example, lighting apparatuses for a stage, loudspeakers, cabling, props and curtain walls for subdividing a large meeting hall are often suspended from the rails of tracks, typically made of steel or aluminum, which are affixed to the ceiling or other overhead structure. Adjustable, slot-engaging fastening hangers, such as disclosed in Kleege, U.S. Pat. No. 7,958,684, incorporated herein by reference, which pass through the slot between the rails of the track are commonly used for suspending the overhead equipment from the track. These brackets allow the location of suspension to be adjusted along the course of the track.

A typical piece of equipment used in meeting rooms is one or more reflective movie screens or large computer or television monitor screens. The screens are often mounted upon stands which rest upon the floor. In order to maintain adequate stability such stands often have legs, or widened bases which extend outwardly from the stand, taking up valuable floor space. In addition, the extended legs or bases can create a tripping hazard and are susceptible to damage. Other items which use stands are lighting equipment, loudspeakers and other audio reinforcement equipment.

Sometimes video screens can be mounted to walls using specialized mounting brackets that can be expensive, unique to a specific type of video screen, and require special skill at mounting properly. Often movable walls or curtains do not provide adequate support for such mounting brackets.

Therefore, there is a need for improved mounting of movie screens and video monitoring equipment which addresses some or all of the above identified inadequacies.

SUMMARY

The principal and secondary objects of the invention are to provide an improved video screen mounting device. These and other objects are achieved by a hand-manipulable, track-engaging, swiveling, adjustable screen mounting framework.

In some embodiments there is provided the combination of a ceiling track and an adjustable framework: wherein said ceiling track comprises a pair of inwardly extending substantially parallel rails separated by a slot having a given slot width; wherein said adjustable framework comprises: a beam including a first end and a second end; a first hanger located proximate said first end for suspending said beam from said track; a second hanger located proximate said second end for suspending said beam from said track; wherein at least one of said first and second hangers is adjustable along a vertical direction; a pivot secured to a medial part of said beam, said pivot comprises: a housing; a spindle rotatively mounted to said housing, and having a first axis of rotation substantially parallel to said vertical direction; a clamp releasably locking the angular position of said spindle in said housing; a first boom extending canteleveredly from said housing; a second boom extending canteleveredly from said housing; a first locking cradle secured to said first boom; and, a second locking cradle secured to said second boom.

In some embodiments said first and second booms are elongated along coaxial axes.

In some embodiments each of said cradles comprises a hook for engaging an oblong member perpendicular to said axis of rotation.

In some embodiments each of said cradles further comprise a cradle lock for releasably securing said member within said hook.

In some embodiments said clamp comprises: said spindle intimately and rotatively engaging a bearing in said housing; said bearing having a substantially cylindrical sidewall; a pair of arcuate chock jaws engaged by a jackscrew; said chock jaws contacting said spindle through an aperture in a said substantially cylindrical sidewall; and, whereby rotation of said jackscrew causes relative movement of said jaws.

In some embodiments said beam comprises at least one level secured proximate to one of said ends.

In some embodiments at least one of said booms comprises a second pair of inwardly extending substantially parallel rails separated by a second slot having a given second slot width.

In some embodiments said given second slot width is commensurate with said slot width.

In some embodiments said pivot is a first pivot, and wherein said combination further comprises a second pivot interposed between said first pivot and said booms so that a second axis of rotation of said second pivot is mutually substantially orthogonal to said first axis of rotation.

In some embodiments there is provided a method for suspending a screen from a ceiling track, said method comprises: selecting a framework which comprises an oblong beam having opposite ends, a pivot secured to a middle part of said beam, a pair of cantelevered booms extending coaxially from opposite sides of said pivot, and a pair of cradles secured to said booms; engaging said opposite ends to said ceiling track; adjusting a distance between at least one of said opposite ends and said track, thereby leveling said beam; hanging a screen from said pair of cradles; rotating said booms with respect to said beam about said pivot, thereby adjusting an angle of said screen with respect to said track; and, locking said pivot, thereby releasably preventing further angular movement of said screen with respect to said ceiling track.

In some embodiments said leveling comprises: repeatedly observing a level affixed to said beam while said adjusting is undertaken.

The original text of the original claims is incorporated herein by reference as describing features in some embodiments.

DESCRIPTION OF THE EXEMPLARY EMBODIMENTS

Figure 1:
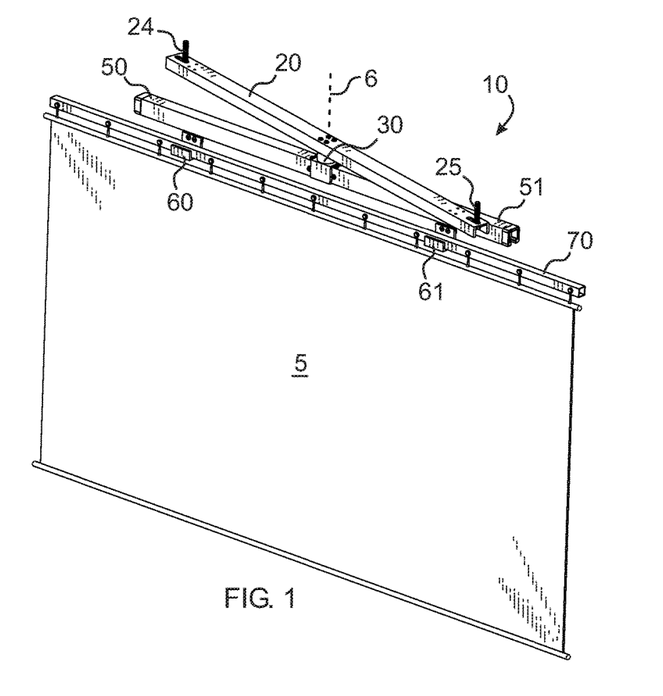
FIG. 1 is a diagrammatic perspective view of a hand-manipulable, track-engaging, swiveling, adjustable screen mounting framework according to an exemplary embodiment of the invention.
Figure 2:
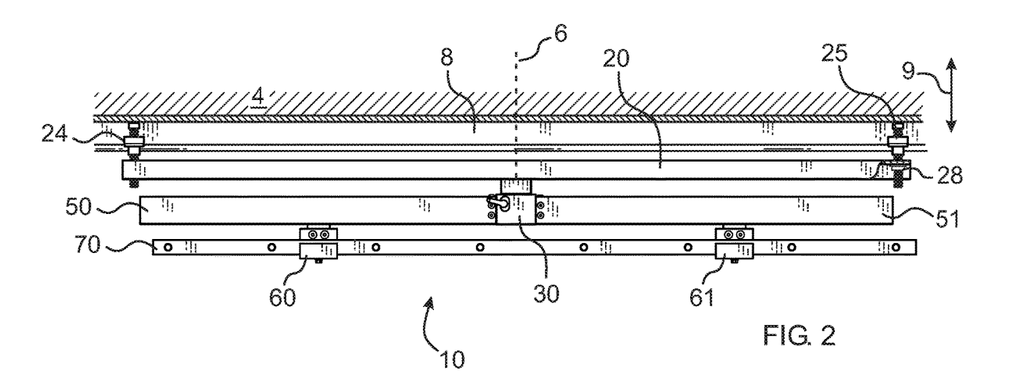
FIG. 2 is a diagrammatic partial cross-sectional side view of the framework of FIG. 1.

In this specification, the references to top, bottom, upward, downward, upper, lower, vertical, horizontal, sideways, lateral, back, front, etc. can be used to provide a clear frame of reference for the various structures with respect to other structures while the framework is suspended from above as shown in FIGS. 1 and 2, and not treated as absolutes when the frame of reference is changed, such as when the framework is laying on the ground or disassembled.

The term "substantially" can be used in this specification because manufacturing imprecision and inaccuracies can lead to non-symmetricity and other inexactitudes in the shape, dimensioning and orientation of various structures. Further, use of "substantially" in connection with certain geometrical shapes and orientations, such as "parallel" and "perpendicular", can be given as a guide to generally describe the function of various structures, and to allow for slight departures from exact mathematical geometrical shapes and orientations, while providing adequately similar function. Those skilled in the art will readily appreciate the degree to which a departure can be made from the mathematically exact geometrical references.

Referring now to the drawing, there is shown in FIGS. 1 and 2 a hand-manipulable, track-engaging, swiveling, adjustable screen mounting framework 10 according to an exemplary embodiment of the invention. The framework can adjustably support a movie screen 5 or other item from an elongated track 8 secured to the underside of a ceiling 4. The framework can include a substantially horizontal beam 20 adjustably attached to the track by a pair of adjustable track-engaging hangers 24,25. The beam can support a locking pivot structure 30 which in turn can support a pair of cantilevered booms 50,51 extending from opposite sides of the pivot structure. The booms can support cradles 60,61 which in turn can support a spar 70 from which dangles the screen 5. The pivot structure allows the booms to rotate with respect to the beam about a rotation axis 6.

Figure 3:
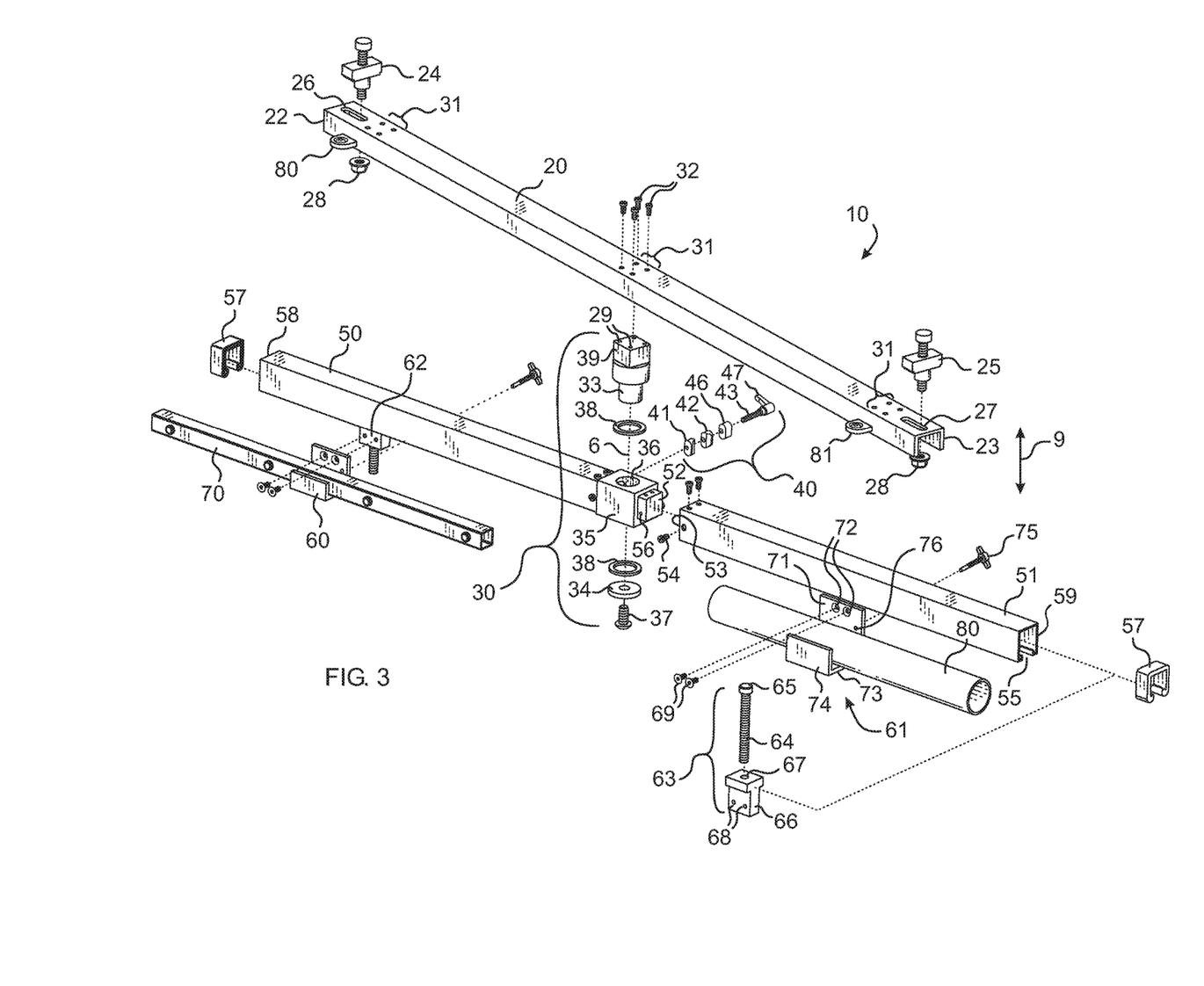
FIG. 3 is a diagrammatic exploded perspective view of the framework of FIG. 1.

FIG. 3 show the function of the framework 10 in greater detail. The framework 10 can include a substantially horizontal, oblong, rigid beam 21 having a pair of opposite ends 22,23. The beam can be made steel or other durable, strong material. The beam can have a structural C-channel shape to provide strength and rigidity while reducing weight and material. A pair of adjustable, track engaging hangers 24,25 engage longitudinal oval slots 26,27 near each end of the beam, adjustably securing the beam to the track. When unlocked, the hangers can slide longitudinally within their respective slots, and slide longitudinally within the track. Each hanger can also be adjusted in the substantially vertical direction 9 by adjusting the nut 28 bearing against the underside of the beam below the oval slot. One or more levels 80,81, such as bubble levels, can mount upon the beam for conveniently providing ready feedback to technicians attempting to mount the framework in a level manner.

The beam 21 supports a locking pivot structure 30 which can mount using screw-type fasteners 32 to the undersurface of the beam at one of a number of seats 31 located in medial location between the hangers 24,25. The locking pivot structure can include a housing 35 having a substantially vertical cylindrical bearing 36 rotatively engaged by a spindle 33 having a substantially vertical axis of rotation 6. The spindle can be held axially engaged in the bearing by a lower retaining disk 34 fastened by a fastener 37. A pair of low-friction washers 38 made from a material such as ultra high molecular weight (UHMW) plastic allow smooth yet rugged rotation of the spindle within the bearing. A substantially quadrangular block 39 formed into the top of the spindle allows it to secure intimately and ruggedly to the underside of the beam 20 by screw-type fasteners engaging threaded holes 29 in the block.

The locking pivot structure 30 can pivotably support a pair of cantilevered booms 50,51 extending from substantially opposite sides of the pivot structure in a substantially coaxial manner. Each boom 50 can have a structural C-channel shape to provide strength and rigidity while reducing weight and material, and to create and underslot 55 similar to the ceiling track 8 which can be adjustably engaged by hangers as will be described below. Each boom 50 can connect to a tongue 52 protruding laterally from the housing 35 of the pivot structure 30. The tongue can be shaped and dimensioned to intimately engage the open end 53 of the boom. The boom can be secured upon the tongue using screw-type fasteners 54 engaging threaded holes 56 in the tongue. Protective end caps 57 fit onto the free ends 58,59 of the booms. The length of the booms can be selected so that they do not interfere with access from the bottom to the hangers hanging the beam as shown in FIG. 2. In this way when the booms and beam are in alignment, i.e. when their axes of elongation lie substantially within one plane, a technician can adjust one or both of the beam hangers in order to adjust their axial position within the track, or to change the vertical position of one or both of the beam ends.

Each of the booms 50,51 can support one or more cradles 60,61 which can attach to cradle hangers 62,63 which slidingly and lockably mount to the booms. Each cradle hanger 63 can include a threaded post 64 engaging a threaded bore 67 in a T-block 66. The threaded post can have a swiveling upper capital 65 for bearing against the inner upper surface of the boom when the hanger is locked in place. The T-block engages through the slot of a boom and bears from above against the inwardly projecting rails of the boom. A lower, exposed portion of the T-block has threaded holes 68 for fasteners 69 fastening a cradle or other structure thereon. Each cradle forms a generally hook shaped structure having a vertical plate portion 71 having fastening holes 72 for attaching the plate to the exposed portion of the T-block. A horizontal plate portion 73 extends substantially orthogonally from the bottom of the vertical plate portion terminating in a distal upwardly projecting rim portion 74 in order to form a hook for engaging an oblong member such as a lighting rig tube 80 resting in the cradle. A threaded lock pin 75 can engage through a threaded hole 76 in the vertical plate portion perpendicular to an axis of elongation of said oblong member to lock the member in the cradle. The oblong member is thus suspended in an orientation where the axis of elongation of the member is substantially perpendicular to the rotation axis 6 of the spindle 33.

The cradles can be in different shapes and sizes depending on their intended use. For example, a smaller cradle 60 can be used to support a spar 70 from which dangles the screen 5. A larger cradle 61 can be used to support lighting rig tubes 80, or other bulkier structures. Further, since the booms provide a similar function to a ceiling track, other hanger types and associated items can be readily supported by the adaptable framework.

Figure 4:
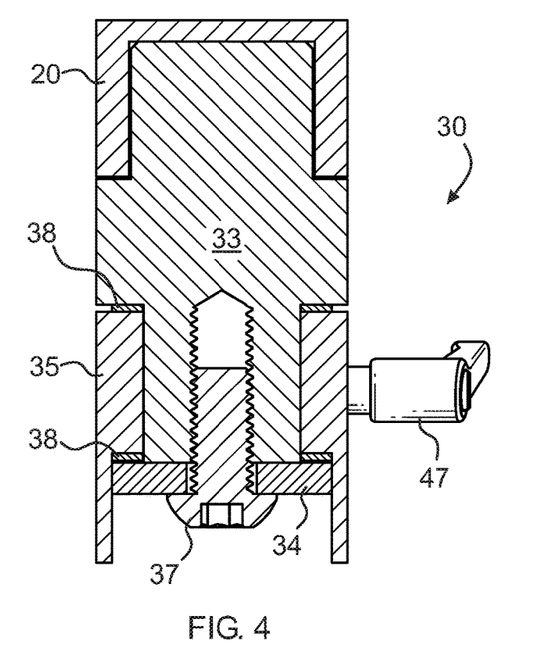
FIG. 4 is a diagrammatic partial cross-sectional side view of the pivot structure.
Figure 5:
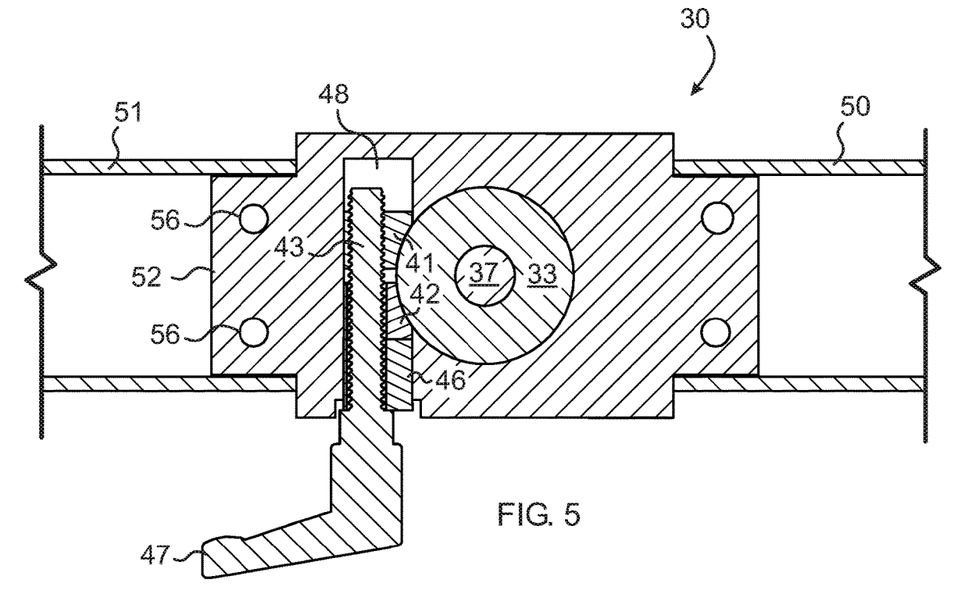
FIG. 5 is a diagrammatic cross-sectional top view of the pivot structure.

As shown in FIGS. 3-5, the angular position of the spindle 33 within the bearing 36 can be locked by a clamp 40. The clamp can include a pair of chock jaws 41,42 which can be driven together and apart by a jackscrew 43 engaging the threaded distal chock jaw 41 after passing through unthreaded apertures 44,45 in the proximal chock jaw 42 and a retaining plug 46. The chock jaws can move axially with respect to the jackscrew within a bearing channel 48 piercing through the housing 35 of the pivot structure 30. Both the chock jaws and the bearing channel can have an oval cross-section to allow axial movement while restrictive angular or other movement with respect to the housing. A handle 47 attached to the jackscrew allows ready manipulation of the clamp.

Figure 6:
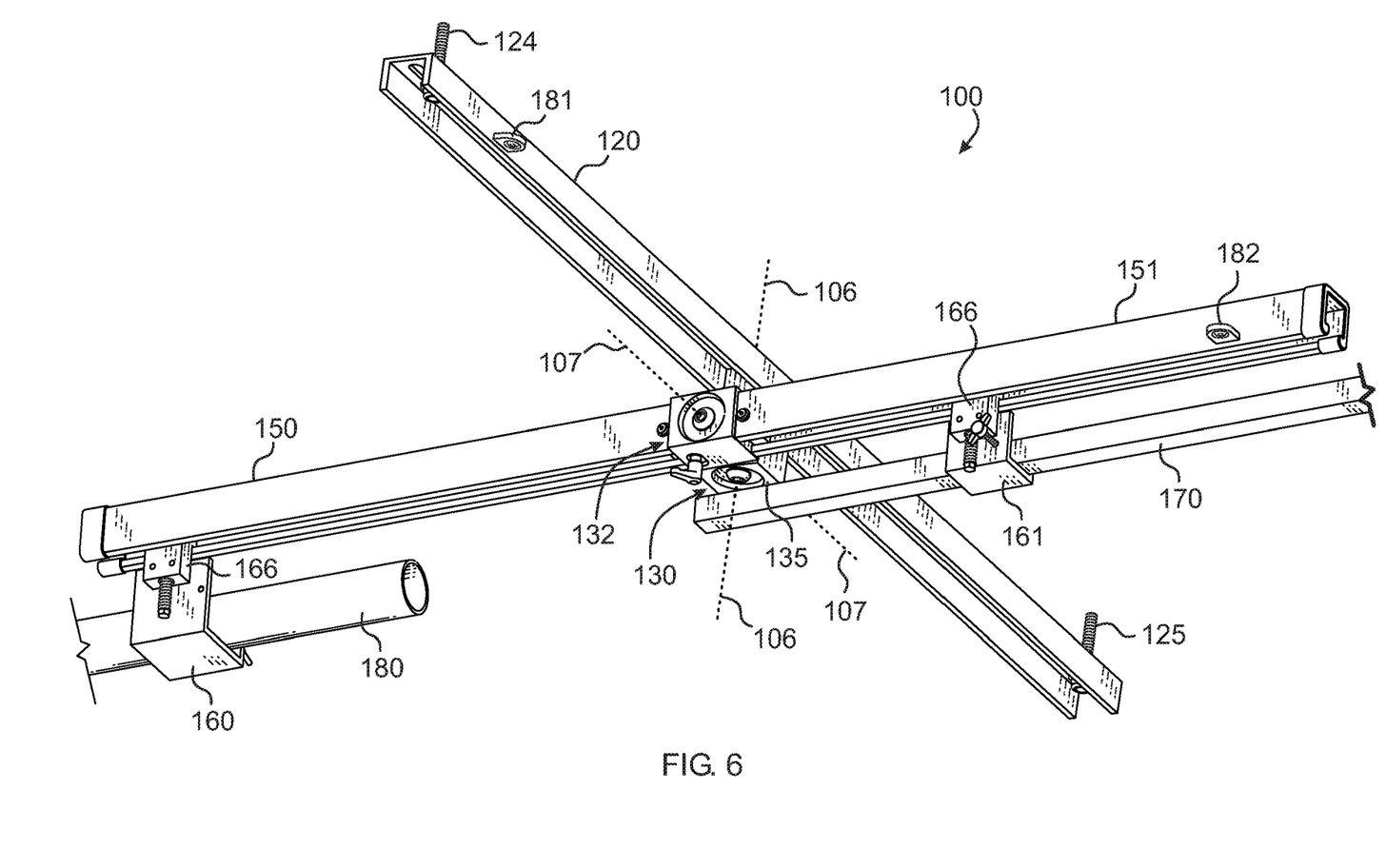
FIG. 6 is a diagrammatic perspective view of a framework according to an alternate exemplary embodiment having two mutually orthogonal pivot structures.

FIG. 6 shows the view from below of an alternate exemplary embodiment of a hand-manipulable, track-engaging, swiveling, adjustable screen mounting framework 100 which provides an additional degree of freedom through the use of a second pivot structure 132 having a second substantially horizontal rotational axis 107 which is substantially orthogonal to a rotational axis 106 of a first pivot structure 130 similar to the pivot structure of the embodiment of FIG. 1. In this embodiment the framework can include a substantially horizontal beam 120 adjustably attached to the track by a pair of adjustable track-engaging hangers 124,125. The beam can support a first locking pivot structure 130 which in turn can support a second locking pivot structure 132. The spindle (not shown) of the second pivot structure can attach to the housing 135 of the first pivot structure. The housing of the second pivot structure can support a pair of cantilevered booms 150,151 extending from opposite sides of the second pivot structure. Similar to the embodiment of FIG. 1, each boom can support a plurality of slidingly adjustable and lockable cradle hangers 166 which in turn can support differently sized cradles 160,161 which can lockingly support items such as a screen-supporting spar 170 or lighting rig tube 180 respectively, or other items. One or more bubble levels 181,182 can be secured to the beam, booms, or other structures to facilitate leveling of the framework.

It is generally counterintuitive to place secondary track below an existing ceiling track since that will make the supporting framework more visible and reduce vertical space. However, by eliminating floor-mounted stands the disclosed framework provides greater functionality to ceiling track mounting systems.

Figure 7:
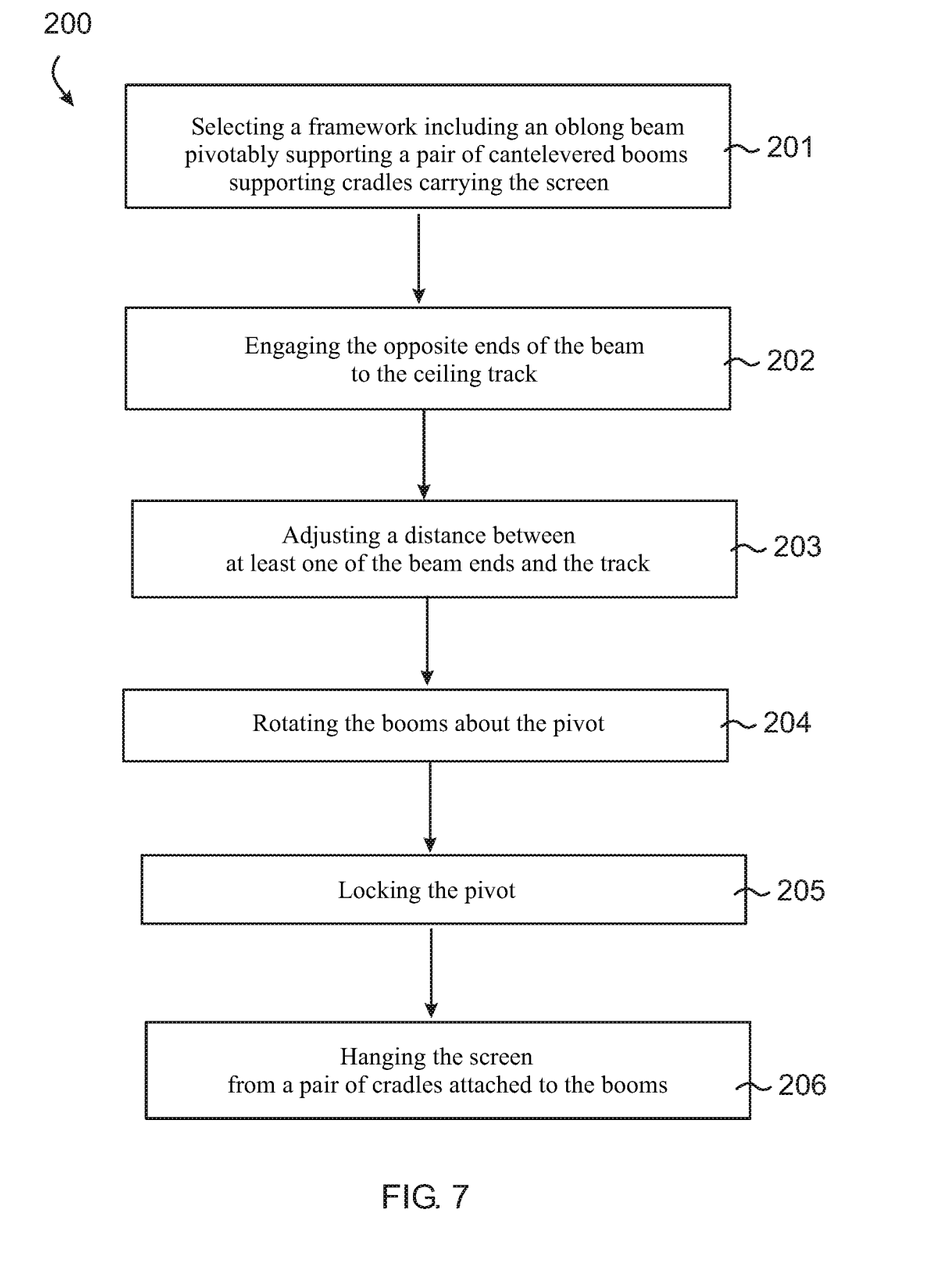
FIG. 7 is a diagrammatic flow chart diagram of a method of mounting an adjustable framework to a ceiling track.

FIG. 7 shows the primary steps of a method 200 for suspending a screen from a ceiling track. The steps include selecting a framework which comprises an oblong beam having opposite ends, a pivot secured to a middle part of said beam, a pair of cantelevered booms extending coaxially from opposite sides of said pivot, and a pair of cradles secured to said booms 201; engaging the opposite ends of the beam to the ceiling track 202; adjusting a distance between at least one of the beam ends and the track, thereby leveling the beam 203; rotating the booms about the pivot, thereby adjusting an angle of the booms with respect to said track 204; locking the pivot, thereby releasably preventing further angular movement of booms with respect to the track 205; and, hanging the screen from a pair of cradles attached to the booms 206.

While the preferred embodiments of the invention have been described, modifications can be made and other embodiments may be devised without departing from the spirit of the invention and the scope of the appended claims.

What is claimed is:

1. The combination of a ceiling track and an adjustable framework:
   wherein said adjustable framework comprises:
      a beam including a first end and a second end;
      a first hanger located proximate said first end for suspending said beam from said track;
      a second hanger located proximate said second end for suspending said beam from said track;
      wherein at least one of said first and second hangers is adjustable along a vertical direction;
      a pivot secured to a medial part of said beam, said pivot comprises:
         a housing;
         a spindle rotatively mounted to said housing, and having a first axis of rotation substantially parallel to said vertical direction;
         a clamp releasably locking the angular position of said spindle in said housing;
         a first boom extending canteleveredly from said housing;
         a second boom extending canteleveredly from said housing;
         a first locking cradle secured to said first boom; and,
         a second locking cradle secured to said second boom.

2. The combination of claim 1, wherein said first and second booms are elongated along coaxial axes.

3. The combination of claim 1, wherein each of said cradles comprises a hook for engaging an oblong member perpendicular to said axis of rotation.

4. The combination of claim 3, wherein each of said cradles further comprise a cradle lock for releasably securing said member within said hook.

5. The combination of claim 1, wherein said clamp comprises:
   said spindle intimately and rotatively engaging a bearing in said housing;
   said bearing having a substantially cylindrical sidewall;
   a pair of arcuate chock jaws engaged by a jackscrew;
   said chock jaws contacting said spindle through an aperture in a said substantially cylindrical sidewall; and,
   whereby rotation of said jackscrew causes relative movement of said jaws.

6. The combination of claim 1, wherein said beam comprises at least one level secured proximate to one of said ends.

7. The combination of claim 1, wherein at least one of said booms comprises a pair of inwardly extending substantially parallel rails separated by a slot having a given slot width.

8. The combination of claim 1, wherein said pivot is a first pivot, and wherein said combination further comprises a second pivot interposed between said first pivot and said booms so that a second axis of rotation of said second pivot is mutually substantially orthogonal to said first axis of rotation.

* * * * *